(12) United States Patent
Wingard et al.

(10) Patent No.: US 7,647,441 B2
(45) Date of Patent: Jan. 12, 2010

(54) COMMUNICATIONS SYSTEM AND METHOD WITH MULTILEVEL CONNECTION IDENTIFICATION

(75) Inventors: Drew E. Wingard, Palo Alto, CA (US); Jay S. Tomlinson, San Jose, CA (US)

(73) Assignee: Sonics, Inc., Milpitas, CA (US)

( * ) Notice: Subject to any disclaimer, the term of this patent is extended or adjusted under 35 U.S.C. 154(b) by 0 days.

(21) Appl. No.: 11/881,526

(22) Filed: Jul. 26, 2007

(65) Prior Publication Data

US 2008/0183926 A1   Jul. 31, 2008

Related U.S. Application Data

(63) Continuation of application No. 11/546,131, filed on Oct. 10, 2006, now abandoned, which is a continuation of application No. 10/787,942, filed on Feb. 25, 2004, now Pat. No. 7,120,712, which is a continuation of application No. 09/721,044, filed on Nov. 21, 2000, now Pat. No. 6,725,313, which is a continuation of application No. 09/191,291, filed on Nov. 13, 1998, now Pat. No. 6,182,183.

(51) Int. Cl.
*G06F 13/00* (2006.01)
*G06F 13/42* (2006.01)

(52) U.S. Cl. .................. 710/105; 710/100; 710/106; 710/107; 710/110

(58) Field of Classification Search ............. 710/100, 710/105, 106, 107, 110
See application file for complete search history.

(56) References Cited

U.S. PATENT DOCUMENTS 4,706,190 A * 11/1987 Bomba et al. ............... 710/108
5,101,479 A * 3/1992 Baker et al. ................. 710/105

(Continued)

FOREIGN PATENT DOCUMENTS

JP           6132162           2/1986

(Continued)

OTHER PUBLICATIONS

Abstract of: JP 5313923 dated Nov. 26, 1993, Ricoh Co. Ltd., 2 pages.

(Continued)

*Primary Examiner*—Mark Rinehart
*Assistant Examiner*—Jeremy S Cerullo
(74) *Attorney, Agent, or Firm*—Rutan & Tucker LLP

(57) ABSTRACT

An embodiment includes a communication medium coupled to a plurality of the functional blocks in an integrated circuit. Three or more of the initiator functional blocks communicate with a target functional block by sending requests having an associated identifier to indicate a transaction stream that the request is part of. At least a first and a second of buffer are associated with the target functional block at an interface of the target functional block to the communication medium and receive requests having the associated identifiers from the three or more initiator functional blocks through a shared common connection point for the interface. The communication medium implements a mapping algorithm to map requests from a first initiator functional block as well as requests from a third initiator functional block to a first dedicated buffer based on the associated identifiers. The mapping algorithm also maps requests from a second initiator functional block to a second buffer based on the associated identifier.

18 Claims, 10 Drawing Sheets

U.S. PATENT DOCUMENTS

| | | | | |
|---|---|---|---|---|
| 5,274,783 | A | * 12/1993 | House et al. | 710/300 |
| 5,548,767 | A | * 8/1996 | Langendorf | 709/227 |
| 5,691,977 | A | * 11/1997 | Yoshimura et al. | 370/250 |
| 5,729,529 | A | * 3/1998 | Martinsson | 370/235 |
| 5,748,914 | A | * 5/1998 | Barth et al. | 710/105 |
| 5,794,062 | A | 8/1998 | Baxter | |
| 5,822,553 | A | * 10/1998 | Gifford et al. | 710/305 |
| 5,845,154 | A | 12/1998 | Krakirian | |
| 5,878,045 | A | * 3/1999 | Timbs | 370/466 |
| 5,948,089 | A | 9/1999 | Wingard et al. | |
| 6,002,692 | A | 12/1999 | Wills | |
| 6,005,412 | A | 12/1999 | Ranjan et al. | |
| 6,021,450 | A | 2/2000 | Yoshizawa et al. | |
| 6,052,773 | A | 4/2000 | DeHon et al. | |
| 6,147,890 | A | 11/2000 | Kawana et al. | |
| 6,175,886 | B1 | 1/2001 | Usami | |
| 6,182,183 | B1 | 1/2001 | Wingard et al. | |
| 6,216,259 | B1 | 4/2001 | Guccione et al. | |
| 6,493,776 | B1 | 12/2002 | Courtright et al. | |
| 6,601,138 | B2 | * 7/2003 | Otterness et al. | 711/114 |
| 6,725,313 | B1 | 4/2004 | Wingard et al. | |
| 7,120,712 | B2 | 10/2006 | Wingard et al. | |
| 7,325,221 | B1 | 1/2008 | Wingard et al. | |
| 2002/0129173 | A1 | * 9/2002 | Weber et al. | 709/310 |
| 2003/0004699 | A1 | 1/2003 | Choi et al. | |
| 2007/0094429 | A1 | 4/2007 | Wingard et al. | |

FOREIGN PATENT DOCUMENTS

| | | |
|---|---|---|
| JP | 4205247 | 7/1992 |
| JP | 5313923 | 11/1993 |
| JP | 4083987 | 2/2008 |
| TW | NI-151999 | 3/2002 |
| WO | PCT/US99/26901 | 4/2000 |
| WO | WO 00/29961 | 5/2000 |

OTHER PUBLICATIONS

Abstract of: JP 6132162 dated Feb. 14, 1986, Fuji Photo Film Co. Ltd., 2 pages.

Abstract of: JP 4205247 dated Jul. 27, 1992, Fujitsu Ltd; Nippon, 2 pages.

Non-Final Office Action for U.S. Appl. No. 09/191,291 mailed Mar. 21, 2000, 10 pages.

Non-Final Office Action for U.S. Appl. No. 09/721,044 mailed Dec. 19, 2001, 6 pages.

Final Office Action for U.S. Appl. No. 09/721,044 mailed Aug. 12, 2003, 7 pages.

Non-Final Office Action for U.S. Appl. No. 10/787,942 mailed Feb. 17, 2006, 7 pages.

Non-Final Office Action for U.S. Appl. No. 11/546,131 mailed Mar. 28, 2007, 6 pages.

Non-Final Office Action for U.S. Appl. No. 11/546,131 mailed Oct. 31, 2007, 6 pages.

European Patent Office, Office Action for Application No. 99965799.2 mailed Aug. 19, 2008, 3 pages.

Japanese Patent Office, Office Action for Application No. 2000-582902 mailed May 15, 2007, 7 pages.

Taiwan Patent Office, Office Action for Application No. 88119862 mailed Jul. 25, 2001, 7 pages.

Spragins John D., et al., "Telecommunications: Protocols and Design", (ISBN: 0-21-09290-5, Jul. 1992), pp. 18 total.

Wayne Luk et al., "Modelling and Optimising Run-Time Reconfigurable Systems", Proceedings of the IEEE Symposium on FPGAs for Custom Computing Machines, Apr. 1996. pp. 167-176.

http://www.faqs.org/faqs/threads-faq/part1/, "comp.programming. threads FAQ [last mod. May 24, 1997]", (last modified date), pp. 1-18.

"Multisequencing a Single Instruction Stream—Concurrent execution on Alternative Decoder Paths"—IBM Technical Disclosure Bulletin, May 1993—NN9305211.

* cited by examiner

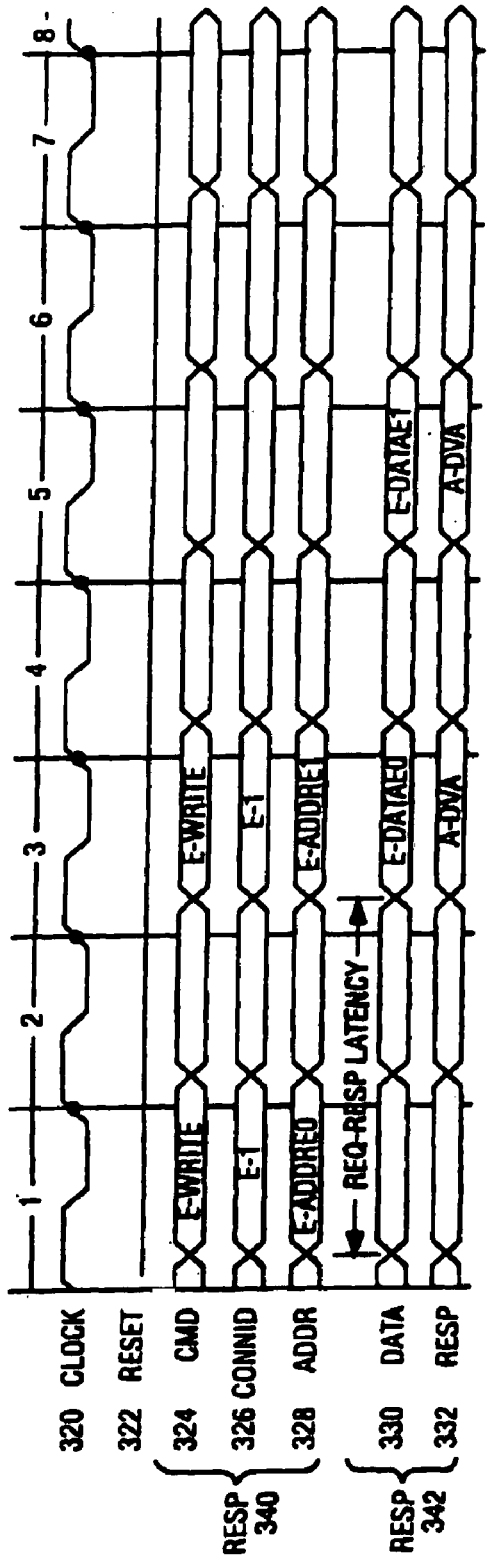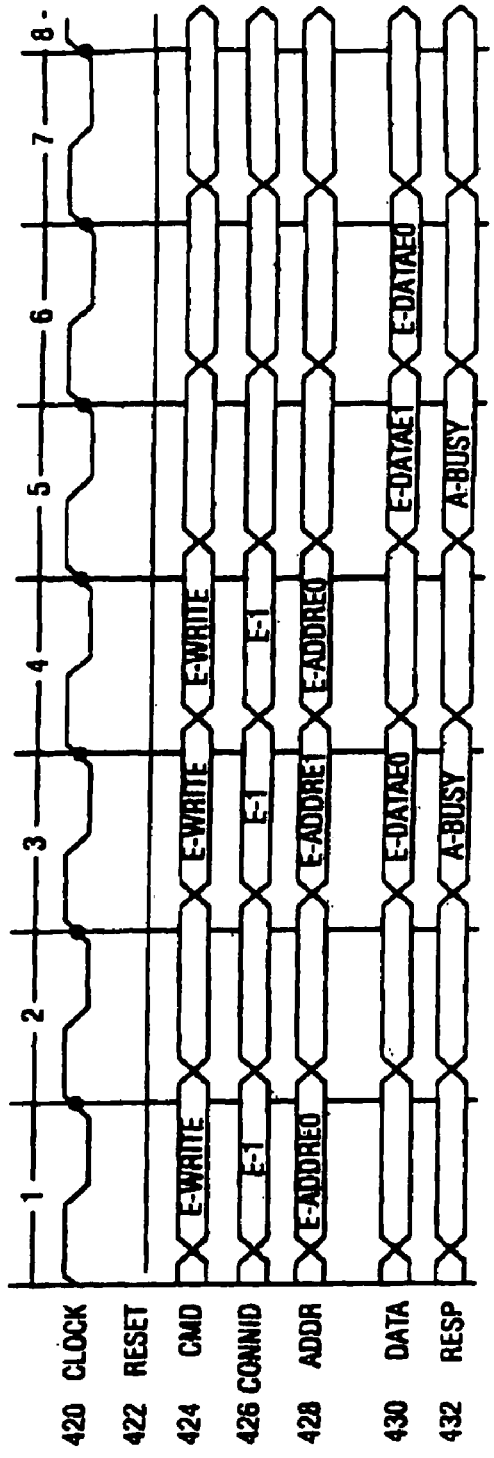

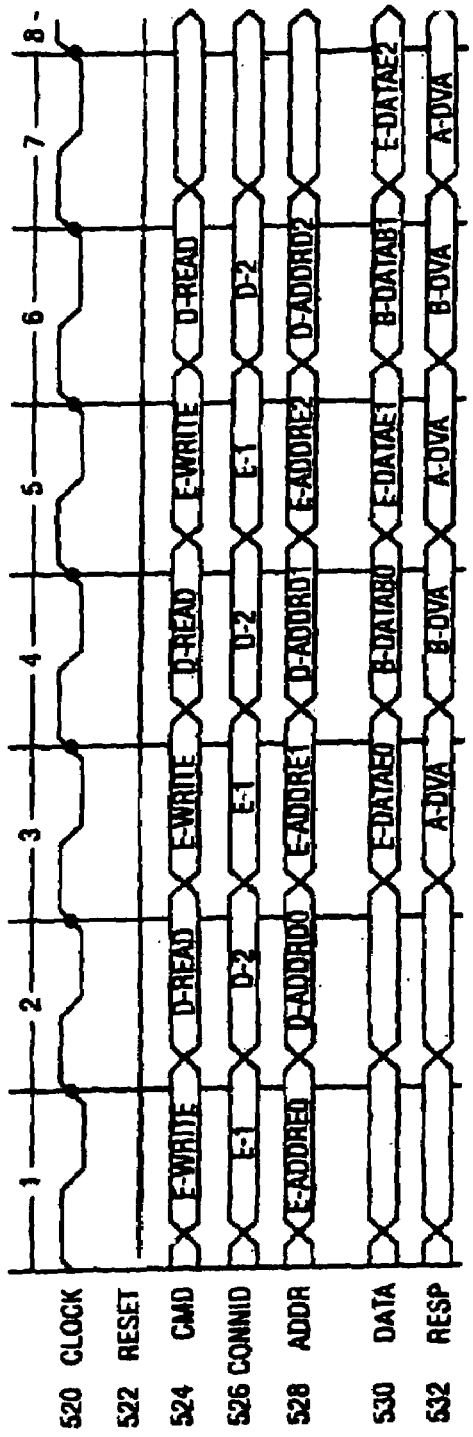
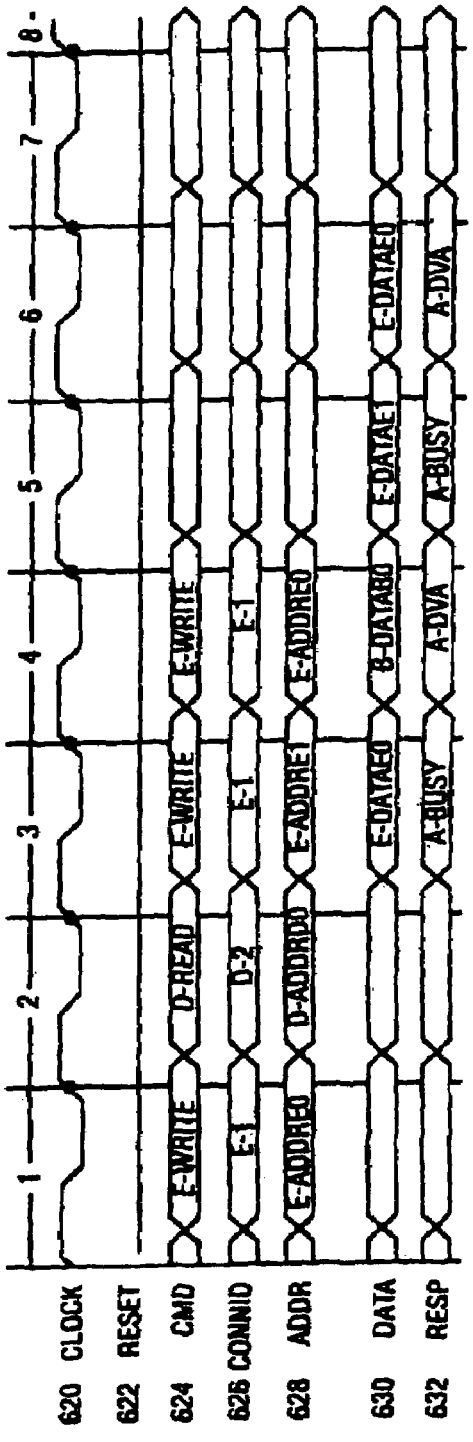

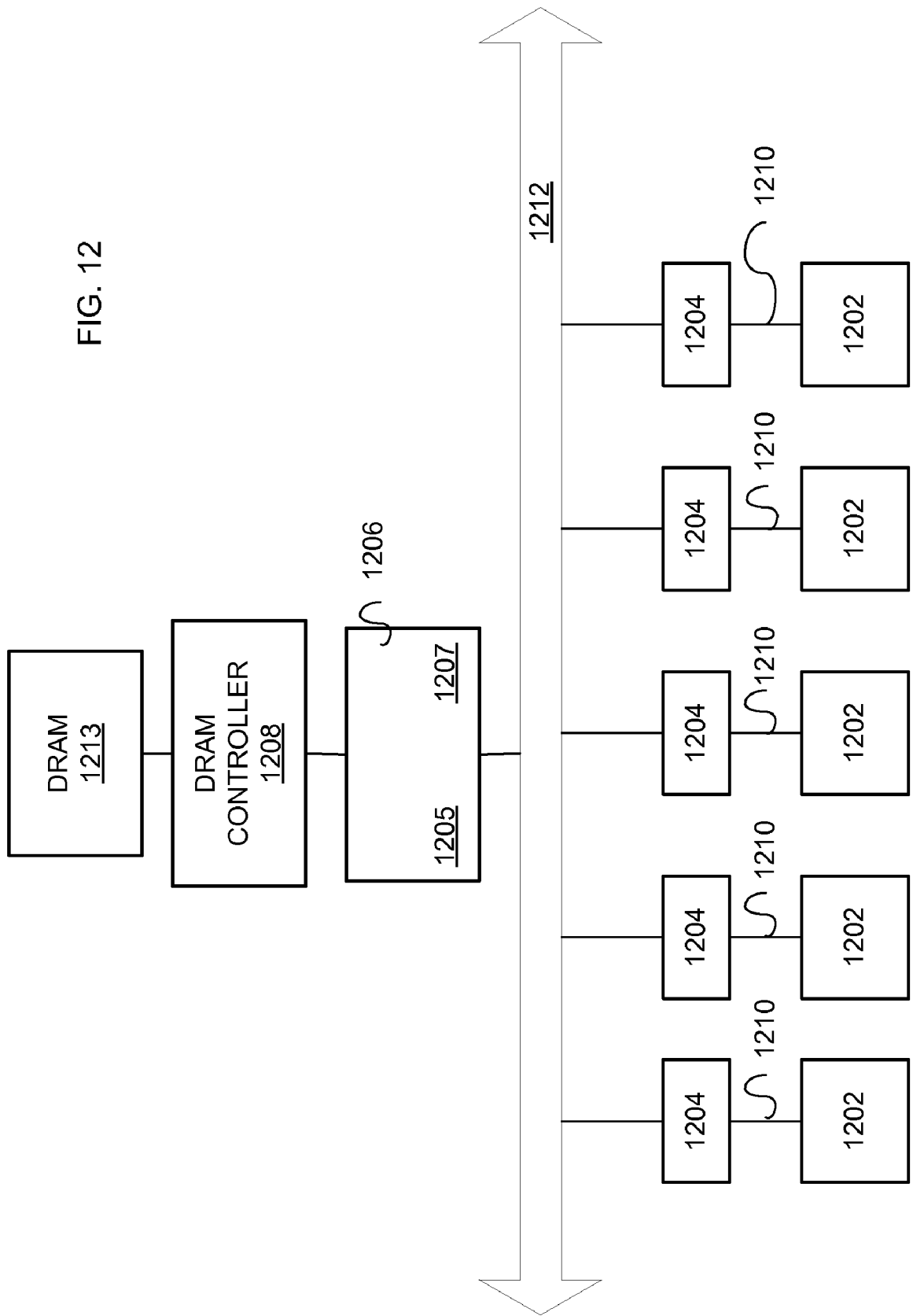

COMMUNICATIONS SYSTEM AND METHOD WITH MULTILEVEL CONNECTION IDENTIFICATION

RELATED APPLICATIONS

This application is a continuation application of and claims the benefit of and incorporates in by reference the following U.S. application Ser. No. 11/546,131 filed Oct. 10, 2006 now abandoned, which is a continuation of application Ser. No. 10/787,942, now U.S. Pat. No 7,120,712 filed Feb. 25, 2004, which is a continuation of application Ser. No. 09/721,044, now U.S. Pat. No. 6,725,313 filed Nov. 21, 2000, which is a continuation of application Ser. No. 09/191,291, now U.S. Pat. No. 6,182,183 filed Nov. 13, 1998.

FIELD OF THE INVENTION

The present invention relates to a communication system to couple computing sub-systems.

BACKGROUND OF THE INVENTION

Electronic computing and communications systems continue to include greater numbers of features and to increase in complexity. At the same time, electronic computing and communications systems decrease in physical size-and cost per function. Rapid advances in semiconductor technology such as four-layer deep-sub-micron complimentary metal-oxide semiconductor (CMOS) technology, have enabled true "system-on-a-chip" designs. These complex designs may incorporate, for example, one or more processor cores, a digital signal processing (DSP) core, several communications interfaces, and graphics support in application-specific logic. In some systems, one or several of these extremely complex chips must communicate with each other and with other system components. Significant new challenges arise in the integration, verification and testing of such systems because efficient communication must take place between sub-systems on a single complex chip as well as between chips on a system board. One benefit to having an efficient and flexible method for communication between sub-systems and chips is that system components can be reused in other systems with a minimum of redesign.

One challenge in the integration, verification and testing of modern electronic systems stems from the fact that modern electronic systems in many application areas have functionality, cost and form-factor requirements that mandate the sharing of resources, such as memory, among multiple functional blocks, where functional blocks can be any entity that interfaces to a communication system. In such systems, the functional blocks typically possess different performance characteristics and requirements, and the communications system and shared resources must simultaneously satisfy the total requirements. Key requirements of typical functional blocks are bandwidth and latency constraints that can vary over several orders of magnitude between functional blocks. In order to simultaneously satisfy constraints that vary so widely, communications systems must provide high degrees of predictability.

Traditional approaches to the design of communications systems for modern, complex computer systems have various strengths and weaknesses. An essential aspect of such approaches is the communications interface that various sub-systems present to one another. One approach is to define customized point-to-point interfaces between a sub-system and each peer with which it must communicate. This customized approach offers protocol simplicity, guaranteed performance, and isolation from dependencies on unrelated sub-systems. Customized interfaces, however, are by their nature inflexible. The addition of a new sub-system with a different interface requires design rework.

A second approach is to define a system using standardized interfaces. Many standardized interfaces are based on pre-established computer bus protocols. The use of computer buses allows flexibility in system design, since as many different functional blocks may be connected together as required by the system, as long as the bus has sufficient performance. It is also necessary to allocate access to the bus among various sub-systems. In the case of computer buses, resource allocation is typically referred to as arbitration.

One disadvantage of computer buses is that each sub-system or component connected to the bus is constrained to use the protocol of the bus. In some cases, this limits the performance of the sub-system. For example, a sub-system may be capable of handling multiple transaction streams simultaneously, but the bus protocol is not capable of fully supporting concurrent operations. In the case of a sub-system handling multiple transaction streams where each transaction stream has ordering constraints, it is necessary for the sub-system to identify each increment of data received or transmitted with a certain part of a certain data stream to distinguish between streams and to preserve order within a stream. This includes identifying a sub-system that is a source of a data transmission. Conventionally, such identification is limited to a non-configurable hardware identifier that is generated by a particular sub-system or component.

Current bus systems provide limited capability to preserve order in one transaction stream by supporting "split transactions" in which data from one transaction may be interleaved with data from another transaction in the same stream. In such a bus, data is tagged as belonging to one stream of data, so that it can be identified even if it arrives out of order. This requires the receiving sub-system to decode an arriving address to extract the identification information.

Current bus systems do not support true concurrency of operations for a sub-system that can process multiple streams of transactions over a single interconnect, such as a memory controller that handles access to a single dynamic random access memory (DRAM) for several clients of the DRAM. A DRAM controller may require information related to a source of an access request, a priority of an access request, ordering requirements, etc. Current communication systems do not provide for such information to be transmitted with data without placing an additional burden on the sub-system to adapt to the existing protocol.

In order for many sub-systems to operate in conventional systems using all of their capabilities, additional knowledge must be designed into the sub-systems to provide communication over existing communication systems. This makes sub-systems more expensive and less flexible in the event the sub-system is later required to communicate with new sub-systems or components. Existing communication approaches thus do not meet the requirements of today's large, complex electronics systems. Therefore, it is desirable for a communications system and mechanism to allow sub-systems of a large, complex electronics system to inter-operate efficiently regardless of their varying performance characteristics and requirements.

SUMMARY OF THE INVENTION

Various apparatus and methods related to a communication system. An embodiment includes a communication medium coupled to a plurality of the functional blocks, including initiator functional blocks and target functional blocks, in an integrated circuit. Three or more of the initiator functional blocks communicate with a target functional block by sending requests having an associated identifier to indicate a transaction stream that the request is part of. A plurality of buffers are associated with the target functional block at an interface of the target functional block to the communication medium. The plurality of buffers receive requests associated with the identifiers from the three or more initiator functional blocks through a shared common connection point for the interface of the target functional block to the communication medium. The communication medium implements a mapping algorithm to map a request of a first transaction stream sent by a first initiator functional block to a first buffer based on the identifier associated with the first transaction stream. The mapping algorithm also maps a request of a second transaction stream sent by a second initiator functional block to a second buffer based on the identifier associated with the second transaction stream. The mapping algorithm also maps a request of a third transaction stream sent by a third initiator functional block to the first buffer based on the identifier associated with the third transaction stream. The first buffer is dedicated service request from two or more of the initiator functional blocks including the first and third initiator functional blocks.

BRIEF DESCRIPTION OF THE DRAWINGS

FIG. 6 is a timing diagram showing rejection of a first pipelined write transfer and a successful second write transfer
FIG. 7 is a timing diagram showing interleaving of pipelined read and write transfers.
FIG. 8 is a timing diagram showing interleaved connections to a single target.
FIG. 9 is a timing diagram showing interleaved connections from a single initiator.
FIG. 12 is a block diagram of one embodiment of part of a computer system.

DETAILED DESCRIPTION OF THE INVENTION

The present invention is a communications system and method for allowing multiple functional blocks or sub-systems of a complex electronics system to communicate with each other through a shared communications resource, such as a shared communications bus. In one embodiment, a communications protocol allows multiple functional blocks on a single semiconductor device to communicate to each other. In another embodiment, the communications protocol may be used to allow multiple functional blocks on different semiconductor devices to communicate to each other through a shared off-chip communications resource, such as a bus.

In one embodiment, the present invention is a pipelined communications bus with separate command, address, and data wires. Alternative embodiments include a pipelined communications bus with multiplexed address, data, and control signals. The former embodiment offers higher performance and simpler control than the latter embodiment at the expense of extra wires. The former embodiment may be more appropriate for on-chip communications, where wires are relatively less expensive and performance requirements are usually higher. The latter embodiment offers higher per-wire transfer efficiency, because it shares the same wires among address and data transfers. The latter embodiment may be more appropriate for chip-to-chip communications between semiconductor devices, because package pins and board traces increase the per signal cost, while total required communications performance is usually lower.

Figure 1:
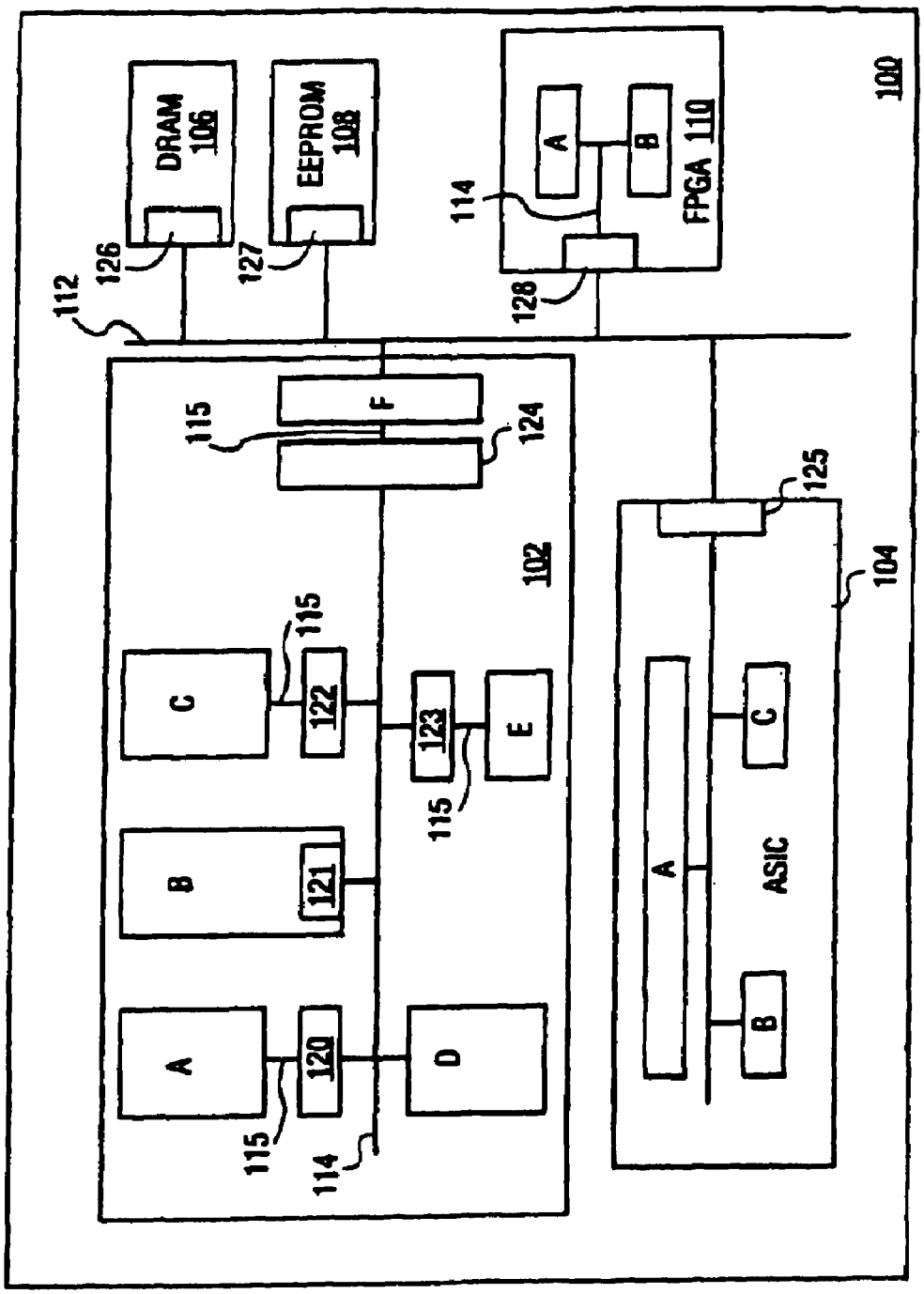
FIG. 1 is a block diagram of one embodiment of a complex electronics system according to the present invention.

FIG. 1 is a block diagram of a complex electronics system 100. Shared communications bus 112 connects sub-systems 102, 104, 106, 108, and 110. Sub-systems are typically functional blocks including a interface module for interfacing to a shared bus. Sub-systems may themselves include one or more functional blocks and may or may not include an integrated or physically separate interface module. In one embodiment, the sub-systems connected by communications bus 112 are separate integrated circuit chips. Sub-system 104 is an application specific integrated circuit (ASIC) which, as is known, is an integrated circuit designed to perform a particular function. Sub-system 106 is a dynamic random access memory (DRAM). Sub-system 108 is an erasable, programmable, read only memory (EPROM). Sub-system 110 is a field programmable gate array (FPGA). Sub-system 102 is a fully custom integrated circuit designed specifically to operate in system 100. Other embodiments may contain additional sub-systems of the same types as shown, or other types not shown. Other embodiments may also include fewer sub-systems than the sub-systems shown in system 100. Integrated circuit 102 includes sub-systems 102A, 102B, 102C, 102D and 102E. ASIC 104 includes functional blocks 101A, 104B and 104C. FPGA 110 includes functional blocks 110A and 110B. A functional block may be a particular block of logic that performs a particular function. A functional block may also be a memory component on an integrated circuit.

System 100 is an example of a system that may consist of one or more integrated circuits or chips. A functional block may be a logic block on an integrated circuit such as, for example, functional block 102E, or a functional block may also be an integrated circuit such as fully custom integrated circuit 102 that implements a single logic function.

Shared communications bus 112 provides a shared communications bus between sub-systems of system 100. Shared communication bus 114 provides a shared communications bus between sub-systems or functional blocks on a single integrated circuit. Some of the functional blocks shown are connected to interface modules through which they send and receive signals to and from shared communications bus 112 or shared communications bus 114. Interconnect 115 is a local point-to-point interconnect for connecting interface modules to functional blocks.

Interface modules 120-127 are connected to various functional blocks as shown. In this embodiment, interface modules 120, 122, 123 and 124 are physically separated from their connected functional block (A, B, C, E and F, respectively). Interface modules 121, and 125-128 are essentially part of their respective functional blocks or sub-systems. Some functional blocks, such as 102D, do not require a dedicated interface module. The arrangement of sub-systems, functional blocks and interface modules is flexible and is determined by the system designer.

In one embodiment there are four fundamental types of functional blocks. The four fundamental types are initiator, target, bridge, and snooping blocks. A typical target is a memory device, a typical initiator is a central processing unit (CPU). A typical bridge might connect shared communications buses 112 and 114. Functional blocks all communicate with one another via shared communications bus 112 or shared communications bus 114 and the protocol of one embodiment. Initiator and target functional blocks may communicate a shared communications bus through interface modules. An initiator functional block may communicate with a shared communications bus through an initiator interface module and a target functional block may communicate with a shared communications bus through a target interface module.

An initiator interface module issues and receives read and write requests to and from functional blocks other than the one with which it is associated. In one embodiment, an initiator interface module is typically connected to a CPU, a digital signal processing (DSP) core, or a direct memory access (DMA) engine.

Figure 2:
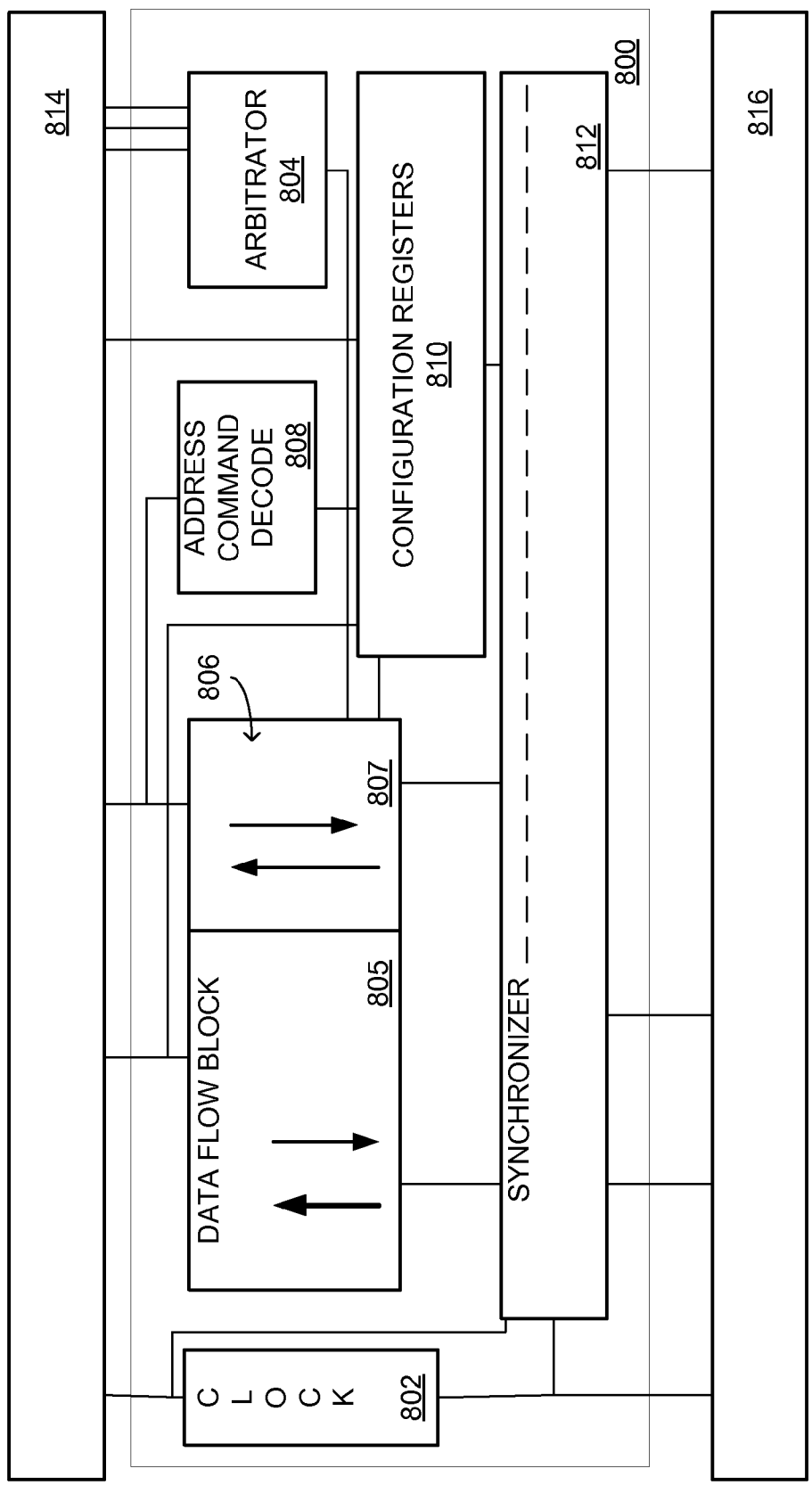
FIG. 2 is an embodiment of an interface module.

FIG. 2 is a block diagram of an embodiment of an initiator interface module 800. Initiator interface module 800 includes clock generator 802, data flow block 806, arbitrator block 804, address/command decode block 808, configuration registers 810, and synchronizer 812. Initiator interface module 800 is connected to a shared communications bus 814 and to an initiator functional block 816. In one embodiment, shared communications bus 814 is a shared communications bus that connects sub-systems, as bus 112 does in FIG. 1.

Clock generator 802 is used to perform clock division when initiator functional block 816 runs synchronously with respect to shared communications bus 814 but at a different frequencies. When initiator functional block 816 runs asynchronously with respect to communications bus 814, clock generator 802 is not used, but synchronizer 812 is used. Arbitrator block 804 performs arbitration for access to shared communications bus 814. In one embodiment, a multi-level arbitration scheme is used wherein arbitrator module 804 includes logic circuits that manage pre-allocated bandwidth aspects of first level arbitration and also logic that manages second level arbitration.

Data flow block 806 includes data flow first-in-first-out (FIFO) buffers 805, 807 between shared communications bus 814 and initiator functional block 816, in addition to control logic associated with managing a transaction between shared communications bus 814 and initiator functional block 816. The FIFO buffers stage 805, 807 both the address and data bits transferred between shared communications bus 814 and initiator functional block 816. In one embodiment, shared communications bus 814 implements a memory mapped protocol. Specific details of an underlying computer bus protocol are not significant to the invention, provided that the underlying computer bus protocol supports some operation concurrency. A preferred embodiment of a bus protocol for use with the present invention is one that supports retry transactions or split transactions, because these protocols provide a mechanism to deliver operation concurrency by interrupting a multi-cycle transaction to allow transfers belonging to other unrelated transactions to take place. These protocols allow for higher transfer efficiencies because independent transactions may use the bus while an initiator waits for a long latency target to return data that has been previously requested by an initiator.

Address/command decode block 808 decodes an address on shared communications bus 814 to determine if a write is to be performed to registers associated with initiator functional block 816. Address/command decode block 808 also decodes incoming commands. Configuration registers 810 store bits that determine the state of module 800, including bandwidth allocation and client address base. One register 810 stores an identification (ID) which is a set of bits uniquely identifying initiator functional block 816.

Figure 3:
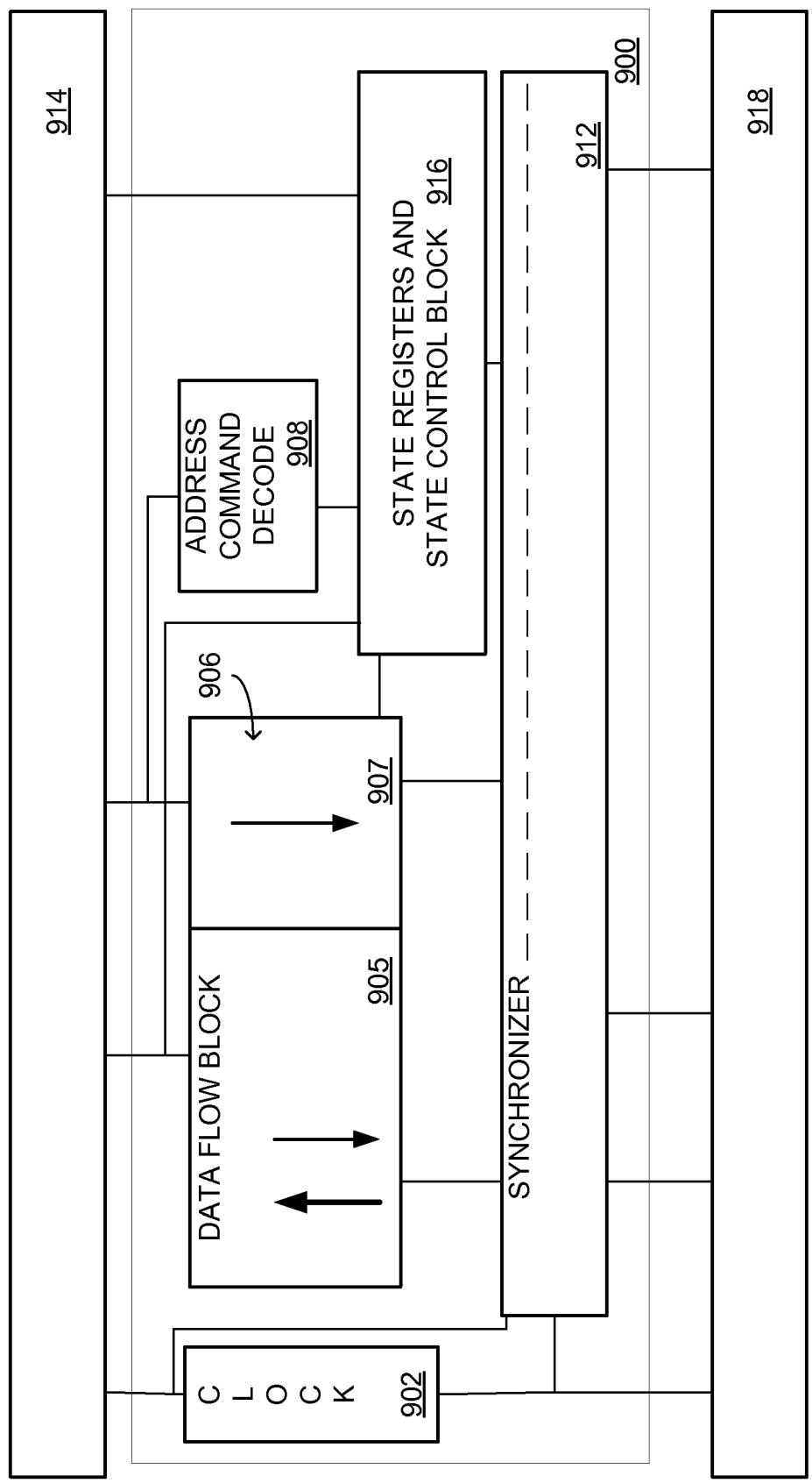
FIG. 3 is an embodiment of an interface module.

FIG. 3 is a block diagram of an embodiment of a target interface module 900. Target interface module 900 is connected to shared communications bus 914 and to target functional block 918. Target interface module 900 includes clock generator 902, data flow block 905-907, address/command decode block 908, synchronizer 912, and state registers in state control block 916. Blocks of target interface module 900 that are named similarly to blocks of initiator module 800 function in substantially the same way as explained with respect to initiator block 800. State registers and state control block 916 include registers that store, for example, client address base and an identifier for target functional block 918.

In one embodiment, an initiator functional block such as initiator functional block 816 may also act as a target functional block in that it has the capability to respond to signals from other functional blocks or sub-systems as well as to initiate actions by sending signals to other functional blocks or sub-system.

Figure 4:
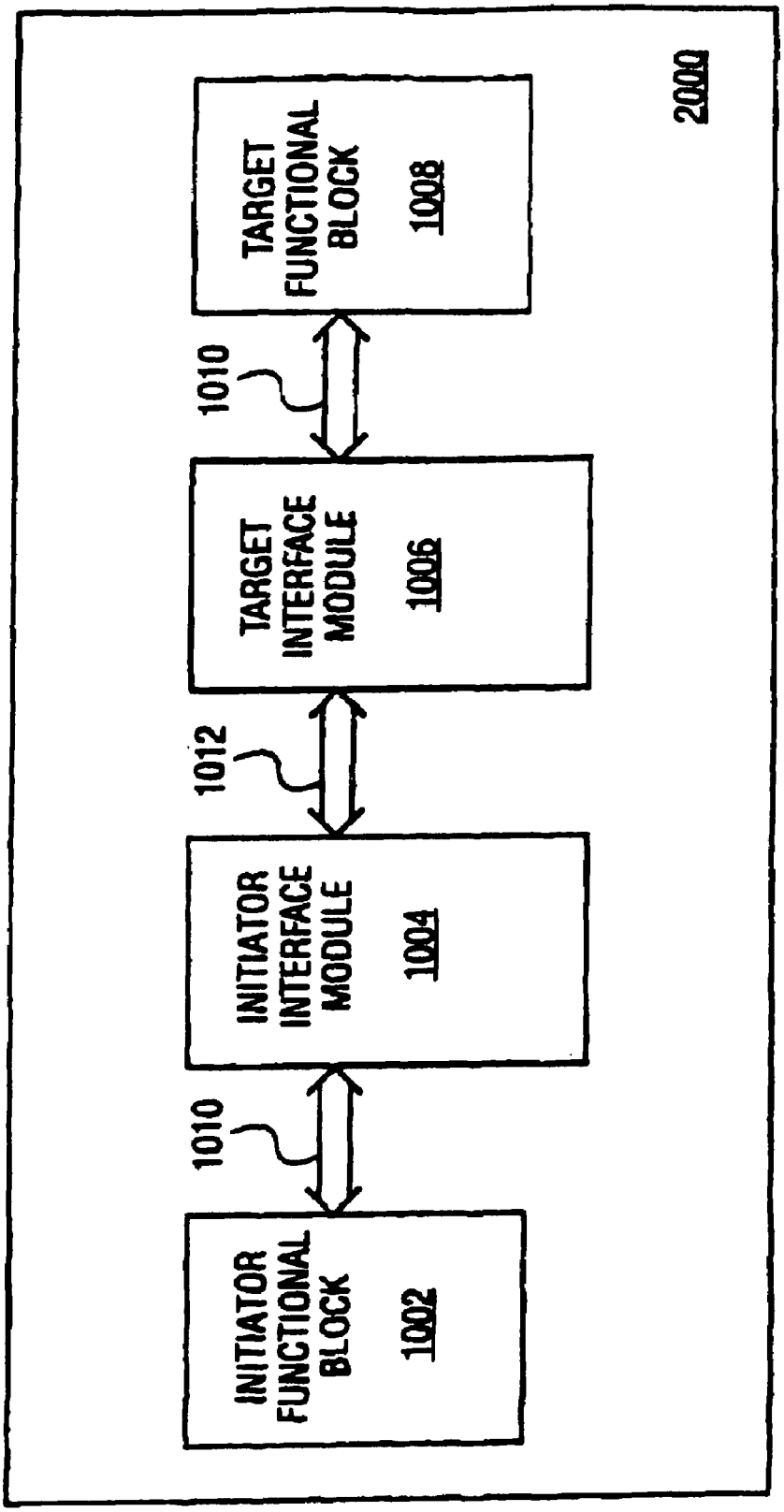
FIG. 4 is an embodiment of a communications bus.

FIG. 4 is a block diagram of a part of a computer system 1000 according to one embodiment. FIG. 4 is useful in illustrating multilevel connection identification. System 1000 includes initiator functional block 1002, which is connected to initiator interface module 1004 by interconnect 1010. Initiator interface module 1004 is connected to target interface module 1006 by shared communications bus 1012. Target interface module 1006 is connected to target functional block 1008 by an interconnect 1010. Typically, shared communications bus 1012 is analogous to shared communications bus 112 of FIG. 1 or to shared communications bus 114 of FIG. 1. Interconnects 1010 are typically analogous to interconnect 115 of FIG. 1 in that they connect functional blocks to interface modules and are point-to-point, rather than shared, interconnects. Interconnects 1010 are typically physically shorter than shared communications bus 1012 because of their local nature. As will be explained more fully below, system 1000 uses two different levels of connection identification depending upon the requirements of a particular functional block. "Global" connection identification information is sent on shared communications bus 1012, while "local" connection information, or thread identification information, is sent in interconnects 1010.

Figure 5:
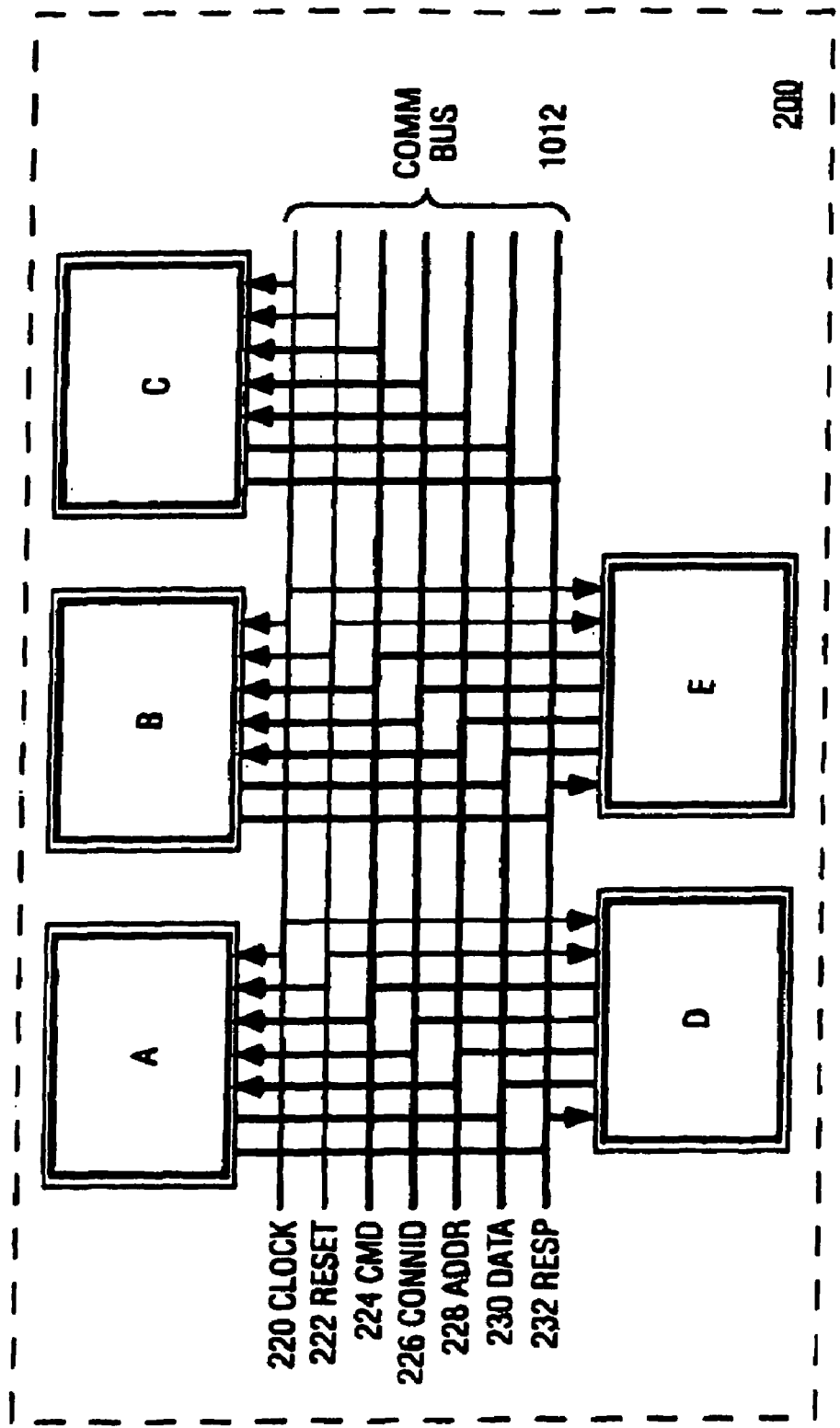
FIG. 5 is a timing diagram showing pipelined write transfers.

FIG. 5 is a block diagram of one embodiment of a shared communications bus 1012. Shared communications bus 1012 is shown connected to entities A, B, C, D and E, which may be interface modules, functional blocks, or a combination of both. Shared communications bus 1012 is composed of a set of wires. Data wires 230 provide direct, high efficiency transport of data traffic between functional blocks on shared communications bus 1012. In one embodiment, shared communications bus 1012 supports a bus protocol that is a framed, time division multiplexed, fully pipelined, fixed latency communication protocol using separate address, data and connection identification wires. The bus protocol supports fine grained interleaving of transfers to enable high operation concurrency, and uses retry transactions to efficiently implement read transactions from target devices with long or variable latency. Details of the arbitration method used to access shared communications bus 1012 are not required to understand the present invention. The delay from when an initiator functional block drives the command and address until the target functional block drives the response is known as the latency of shared communications bus 1012. The bus protocol supports arbitration among many initiator functional blocks and target functional blocks for access to the bus. In the embodiment shown, arbitration for access to shared communications bus 1012 is performed by an initiator interface module, such as module 1004 of FIG. 4. In other embodiments, arbitration is performed by functional blocks directly, or by a combination of interface modules and functional blocks. In one embodiment, a bus grant lasts for one pipelined bus cycle. The protocol does not forbid a single functional block from becoming a bus owner for consecutive bus cycles, but does require that the functional block successfully win arbitration on consecutive cycles to earn the right.

Shared communications bus 1012 includes separate address, data, and control wires. Other embodiments may include multiplexed address, data, and control signals that share a wire or wires. Such an embodiment would provide high per-wire transfer efficiency because wires are shared among address and data transfers. A non-multiplexed embodiment of shared communications bus 1012 may be more appropriate for communication between functional blocks on a single integrated circuit chip because wires are relatively inexpensive and performance requirements are usually higher on a single integrated circuit chip.

Clock line 220 is a global signal wire that provides a time reference signal to which all other shared communications bus 1012 signals are synchronized. Reset line 222 is a global signal wire that forces each connected functional block into a default state from which system configuration may begin. Command line 224 carries a multi-bit signal driven by an initiator bus owner. In various embodiments, the multi-bit command signal may convey various types of information. For example, a command signal may indicate a transfer type, information regarding duration of a connection, and expected initiator and target behavior during the connection. In one embodiment, the command signal includes one or more bits indicating the beginning and end of a connection. In one embodiment, for example, one bit may indicate the status of a connection. If the bit is zero, the current transfer is the final transfer in the connection. After the receipt of a zero connection status bit, the next receipt of a connection status bit that is a logic one indicates that the transfer is the first in a newly opened connection. Each subsequently received one connection status bit then indicates that the connection is still open.

Supported transfer types in this embodiment include, but are not limited to read and write transfers. Address lines 228 carry a multi-bit signal driven by an initiator bus owner to specify the address of the object to be read or written during the current transfer. Response lines 232 carry a multi-bit signal driven by a target to indicate the status of the current transfer. Supported responses include, but are not limited to the following responses. A NULL response indicates that the current transfer is to be aborted, presumably because the address does not select any target. A data valid and accepted (DVA) response indicates, in the case of a read, that the target is returning requested data on data lines 230. In the case of a write, a DVA response indicates that the target is accepting the provided data from data lines 230. A BUSY response indicates that the selected target has a resource conflict and cannot service the current request. In this case an initiator should reattempt the transfer again later. A RETRY response indicates that the selected target could not deliver the requested read data in time, but promises to do so at a later time. In this case an initiator must reattempt the transfer at a later time.

Connection identifier (CONNID) lines 226 carry a multi-bit signal driven by an initiator bus owner to indicate which connection the current transfer is part of. A connection is a logical state, established by an initiator, in which data may pass between the initiator and an associated target. The CONNID typically transmits information including the identity of the functional block initiating the transfer and ordering information regarding an order in which the transfer must be processed. In one embodiment, the information conveyed by the CONNID includes information regarding the priority of the transfer with respect to other transfers. In one embodiment the CONNID is a eight-bit code. An initiator interface module sends a unique CONNID along with an initial address transfer of a connection. Later transfers associated with this connection (for example, data transfers) also provide the CONNID value so both sender and receiver (as well as any device monitoring transfers on shared communications bus 1012) can unambiguously identify transfers associated with the connection. One advantage of using a CONNID is that transfers belonging to different transactions can be interleaved arbitrarily between multiple devices on a per cycle basis. In one embodiment, shared communications bus 1012 implements a fully pipelined protocol that requires strict control over transaction ordering in order to guarantee proper system operation. Without the use of a CONNID, ordering constraints within a particular transaction may be violated because transfers associated with a particular connection are not identified.

Because a first command may be rejected by a BUSY response while a later command is already in flight, it is essential to provide mechanisms that allow full control over which commands complete. If such control is not present, ambiguous system behavior can result. For instance, if a single initiator interface module issues a sequence of dependent read and write commands, a busy response to one of the commands could result in later commands returning the wrong data. One solution to such problems is to avoid overlapping dependent commands. This solution, however, increases the latency of every dependent command in order to ensure proper results. The present invention uses a CONNID signal, in part, to allow overlapping of dependent commands. Therefore, use of a CONNID improves system performance and efficiency. Another benefit of the CONNID of the present invention is that communication system predictability is enhanced because it allows a shared functional block to respond to requests based upon quality of service guarantees that may vary between connections. For example, data requested to operate a computer display cannot tolerate unpredictable delay because delay causes the display to flicker. Therefore, the CONNID may be used to prioritize data requests from a display controller so that requests from the display controller to a common resource are serviced before other requests. The present invention also allows for flexible reconfiguration of the CONNID to retune system performance.

FIG. 6 is a timing diagram of a pipelined write transaction consisting of two write transfers on shared communications bus 1012. Reference may also be made to FIG. 5. A single pipelined bus transfer, as shown in FIG. 6, includes an arbitration cycle (not shown), followed by a command/address/CONNID (CMD 324/ADDR 328/CONNID 326) cycle (referred to as a request, or REQ cycle), and completed by a DATA 330/RESP 342 cycle (referred to as a response, or RESP cycle). In one embodiment, the number of cycles between a REQ cycle and a RESP cycle is chosen at system implementation time based upon the operating frequency and module latencies to optimize system performance. The REQ-RESP latency, in one embodiment, is two cycles and is labeled above the DATA 330 signal line on FIG. 6. Therefore, a complete transfer time includes four shared communications bus 1012 cycles, arbitration, request, delay and response.

Two transfers are shown in FIG. 6. On cycle 1, initiator E drives REQ fields 340 to request a WRITE transfer to address ADDRE0. This process is referred to as issuing the transfer request. In one embodiment, a single target is selected to receive the write data by decoding an external address portion of ADDRE0. On cycle 3 (a REQ-RESP latency later), initiator E drives write data DATAE0 on the DATA wires; simultaneously, the selected target A drives RESP wires 342 with the DVA code, indicating that A accepts the write data. By the end of cycle 3, target A has acquired the write data, and initiator E detects that target A was able to accept the write data; and the transfer has thus completed successfully.

Meanwhile (i.e. still in cycle 3), initiator E issues a pipelined WRITE transfer (address ADDRE1) to target A. The write data and target response for this transfer both occur on cycle 5, where the transfer completes successfully. Proper operation of many systems and sub-systems rely on the proper ordering of related transfers. Thus, proper system operation may require that the cycle 3 WRITE complete after the cycle 1 WRITE transfer. In FIG. 6, the CONNID field conveys crucial information about the origin of the transfer that can be used to enforce proper ordering. A preferred embodiment of ordering restrictions is that the initiator and target collaborate to ensure proper ordering, even during pipelined transfers. This is important, because transfer pipelining reduces the total latency of a set of transfers (perhaps a single transaction), thus improving system performance (by reducing latency and increasing usable bandwidth).

According to the algorithm of one embodiment:
1. An initiator may issue a transfer Y: a) if transfer Y is the oldest, non-issued, non-retired transfer among the set of transfer requests it has with matching CONNID, or b) if all of the older non-retired transfers with matching CONNID are currently issued to the same target as transfer Y. If issued under this provision, transfer Y is considered pipelined with the older non-retired transfers.
2. A target that responds to a transfer X in such a way that the initiator might not retire the transfer must respond BUSY to all later transfers with the same CONNID as transfer X that are pipelined with X.

Note that an older transfer Y that is issued after a newer transfer X with matching CONNID is not considered pipelined with X, even if Y Issues before X completes. This situation is illustrated in FIG. 7. If target A has a resource conflict that temporarily prevents it from accepting DATAE0 associated with the WRITE ADDRE0 from cycle 1, then A responds BUSY. Step 2 of the foregoing algorithm requires that A also reject (using BUSY) any other pipelined transfers from the same CONNID (in this case, CONNID 1), since the initiator cannot possibly know about the resource conflict until after the REQ-RESP latency has passed. Thus, target A must BUSY the WRITE ADDRE1 that is issued in cycle 3, because it has the same CONNID and was issued before the initiator could interpret the BUSY response to the first write transfer, and is thus a pipelined transfer. Furthermore, the second attempt (issued in cycle 4) of the WRITE ADDRE0 transfer is allowed to complete because it is not a pipelined transfer, even though it overlaps the cycle 3 WRITE ADDRE1 transfer.

Note that target A determines that the cycle 4 write is not pipelined with any earlier transfers because of when it occurs and which CONNID it presents, and not because of either the CMD nor the ADDR values. Step 1 of the algorithm guarantees that an initiator will only issue a transfer that is the oldest non-issued, non-retired transfer within a given connection. Thus, once the first WRITE ADDRE0 receives the BUSY response in cycle 3, it is no longer issued, and so it becomes the only CONNID=1 transfer eligible for issue. It is therefore impossible for a properly operating initiator to issue a pipelined transfer in cycle 4, given that an initial cycle 1 transfer received a BUSY response and the REQ-RESP latency is two cycles.

One embodiment of the initiator maintains a time-ordered queue consisting of the desired transfers within a given CONNID. Each transfer is marked as non-issued and non-retired as they are entered into the queue. It is further marked as pipelined if the immediately older entry in the queue is non-retired and addresses the same target; otherwise, the new transfer is marked non-pipelined. Each time a transfer issues it is marked as issued. When a transfer completes (i.e., when the RESP cycle is finished) the transfer is marked non-issued. If the transfer completes successfully, it is marked as retired and may be deleted from the queue. If the transfer does not complete successfully, it will typically be re-attempted, and thus can go back into arbitration for re-issue. If the transfer does not complete successfully, and it will not be re-attempted, then it should not be marked as retired until the next transfer, if it exists, is not marked as issued. This restriction prevents the initiator logic from issuing out of order. As the oldest non-Retired transfer issues, it is marked as issued. This allows the second-oldest non-retired transfer to arbitrate to issue until the older transfer completes (and is thus marked as non-issued), if it is marked as pipelined.

An embodiment of the target implementation maintains a time-ordered queue whose depth matches the REQ-RESP latency. The queue operates off of the bus clock, and the oldest entry in the queue is retired on each bus cycle; simultaneously, a new entry is added to the queue on each bus cycle. The CONNID from the current REQ phase is copied into the new queue entry. In addition, if the current REQ phase contains a valid transfer that selects the target (via the External Address), then "first" and "busy" fields in the new queue entry may be set; otherwise, the first and busy bits are cleared. The first bit will be set if the current transfer will receive a BUSY response (due to a resource conflict) and no earlier transfer in the queue has the same CONNID and has its first bit set. The first bit implies that the current transfer is the first of a set of potentially-pipelined transfers that will need to be BUSY'd to enforce ordering. The busy bit is set if either the target has a resource conflict or one of the earlier transfers in the queue has the same CONNID and has the first bit set. This logic enforces the REQ-RESP pipeline latency, ensuring that the target accepts no pipelined transfers until the initiator can react to the BUSY response to the transfer marked first.

Application of the algorithm to the initiators and targets in the communication system provides the ability to pipeline transfers (which increases per-connection bandwidth and reduces total transaction latency) while maintaining transaction ordering. The algorithm therefore facilitates high per-connection performance. The fundamental interleaved structure of the pipelined bus allows for high system performance, because multiple logical transactions may overlap one another, thus allowing sustained system bandwidth that exceeds the peak per-connection bandwidths. For instance, FIG. 8 demonstrates a system configuration in which initiator E needs to transfer data to target A on every other bus cycle, while initiator D requests data from target B on every other bus cycle. Since the communication system supports fine interleaving (per bus cycle), the transactions are composed of individual transfers that issue at the natural data rate of the functional blocks; this reduces buffering requirements in the functional blocks, and thus reduces system cost. The total system bandwidth in this example is twice the peak bandwidth of any of the functional blocks, and thus high system performance is realized.

The present invention adds additional system-level improvements in the area of efficiency and predictability. First, the connection identifier allows the target to be selective in which requests it must reject to preserve in-order operation. The system only need guarantee ordering among transfers with the same CONNID, so the target must reject (using BUSY) only pipelined transfers. This means that the target may accept transfers presented with other CONNID values even while rejecting a particular CONNID. This situation is presented in FIG. 9, which adds an interleaved read transfer from initiator D to the pipelined write transfer of FIG. 7. All four transfers in FIG. 9 select target A, and A has a resource conflict that prevents successful completion of the WRITE ADDRE0 that issues in cycle 1. While the rejection of the first write prevents A from accepting any other transfers from CONNID 1 until cycle 4, A may accept the unrelated READ ADDRE0 request of cycle 2 if A has sufficient resources. Thus, overall system efficiency is increased, since fewer bus cycles are wasted (as would be the case if target A could not distinguish between connections).

Second, in one embodiment the connection identifier allows the target to choose which requests it rejects. The target may associate meanings such as transfer priority to the CONNID values, and therefore decide which requests to act upon based upon a combination of the CONNID value and the internal state of the target. For instance, a target might have separate queues (see 905 and 907 as well as 1205, 1207) for storing transfer requests of different priorities. Referring to FIG. 9, the target might have a queue for low priority requests (see 905 as well as 1205) (which present with an odd CONNID) and a queue for high priority requests (see 907 as well as 1207) (which present with an even CONNID). Thus, the CONNID 1 WRITE ADDRE0 request of cycle 1 would be rejected if the low-priority queue (see 905 as well as 1205) were full, whereas the CONNID 2 READ ADDRD0 transfer could be completed successfully based upon available high-priority queue (see 907 as well as 1207) resources. Such differences in transfer priorities are very common in highly-integrated electronic systems, and the ability for the target to deliver higher quality of service to higher priority transfer requests adds significantly to the overall predictability of the system.

As FIG. 9 implies, the algorithm described above allows a target to actively satisfy transfer requests from multiple CONNID values at the same time. Thus, there may be multiple logical transactions in flight to and/or from the same target, provided that they have separate CONNID values. Thus, the present invention supports multiple connections per target functional block.

Figure 10:
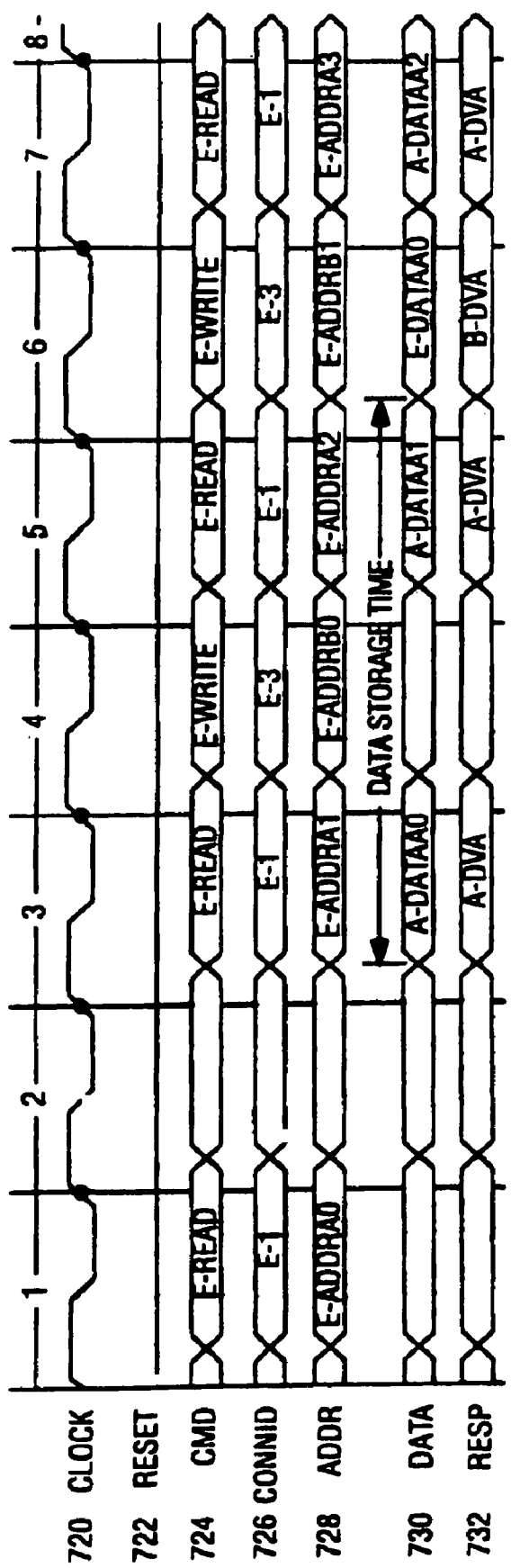
FIG. 10 is a block diagram of one embodiment of part of a computer system.

Additionally, an initiator may require the ability to present multiple transactions to the communications system at the same time. Such a capability is very useful for initiator such as direct memory access (DMA) devices, which transfer data between two targets. In such an application, the DMA initiator would present a read transaction using a first CONNID to a first target that is the source of the data, and furthermore present a write transaction using a second CONNID to a second target that is the data destination. At the transfer level, the read and write transfers could be interleaved. This reduces the amount of data storage in the DMA initiator, thus reducing system cost. Such an arrangement is shown in FIG. 10, where initiator E interleaves pipelined read transfers from target A with pipelined write transfers to target B. Thus, the present invention supports multiple connections per initiator functional block.

The control structures required to support implementation of the present invention, as described above with respect to the algorithm, are simple and require much less area than the data buffering area associated with traditional protocols that do not provide efficient fine interleaving of transfers. Thus, the present invention minimizes communication system area and complexity, while delivering high performance and flexibility.

Finally, the CONNID values that are associated with particular initiator transactions should typically be chosen to provide useful information such as transfer priorities but also to minimize implementation cost. It is useful to choose the specific CONNID values at system design time, so the values can be guaranteed to be unique and can be ordered to simplify comparison and other operations. Furthermore, it is frequently useful to be able to change the CONNID values during operation of the communications system so as to alter the performance and predictability aspects of the system. Preferred implementations of the present invention enable flexible system configuration by storing the CONNID values in ROM or RAM resources of the functional blocks, so they may be readily re-configured at either system build time or system run time.

Figure 11:
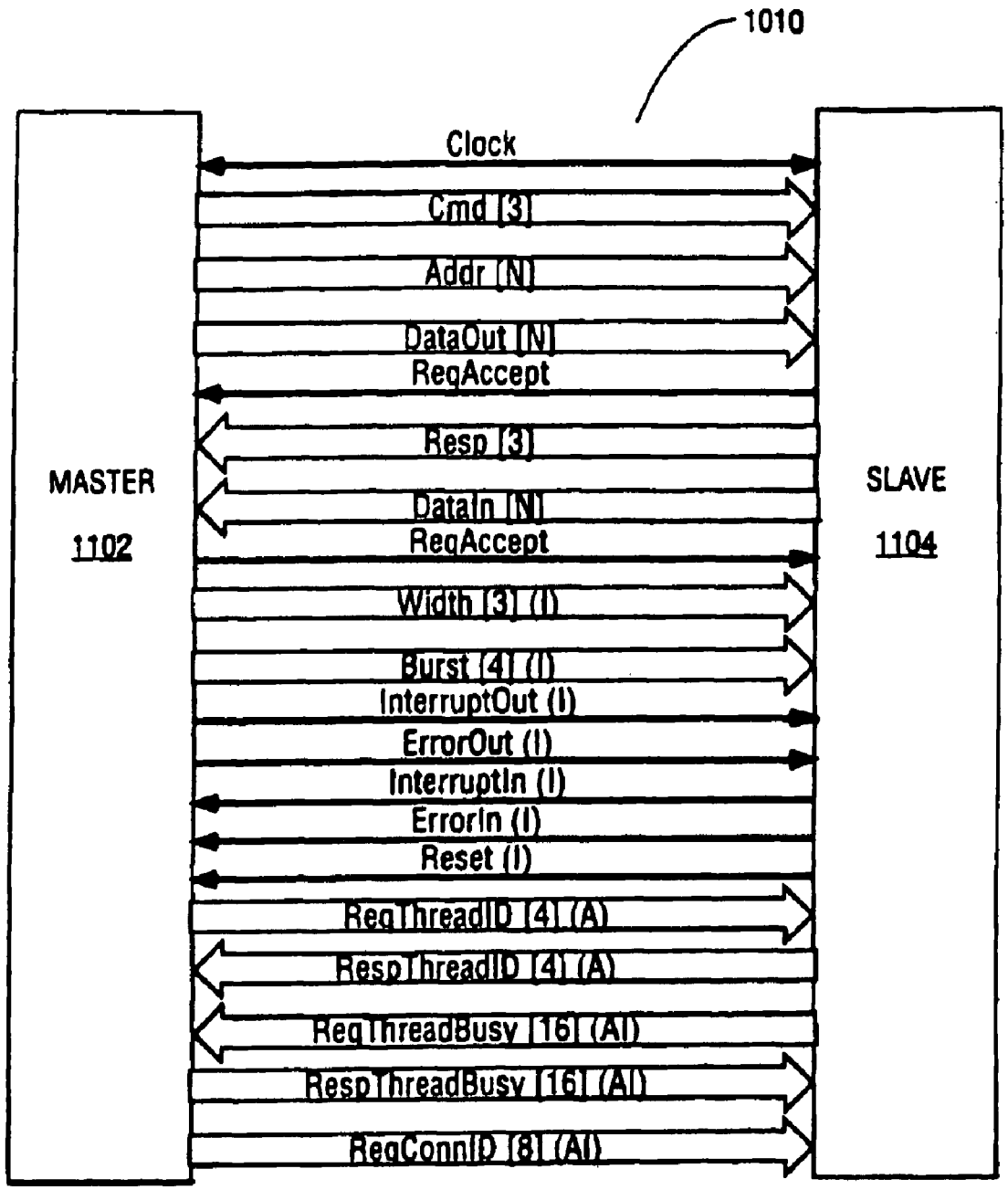
FIG. 11 is one embodiment of a communications bus.

FIG. 11 shows an interconnect 1010, which is a point-to-point interconnect as shown in FIG. 4. Interconnect 1010 includes additional signals as compared to the protocol described with reference to FIG. 5. As will be explained below, some of the additional signals are particularly useful as signals sent over point-to-point interconnects such as interconnects 1010. The protocol of interconnect 1010 controls point-to-point transfers between a master entity 1102 and a slave entity 1104 over a dedicated (non-shared) interconnect. Referring to FIG. 4, a master entity may be, for example, initiator functional block 1002 or target interface module 1006. A slave entity may be, for example, initiator interface module 1004 or target functional block 1008.

Signals shown in FIG. 11 are labeled with signal names. In addition, some signal names are followed by a notation or notations in parentheses or brackets. The notations are as follows:

(I) The signal is optional and is independently configurable (A) The signal must be configured together with signals having similar notations (AI) The signal is independently configurable if (A) interface modules exist

[#] Maximum Signal Width

The clock signal is the clock of a connected functional block. The command (Cmd) signal indicates the type of transfer on the interconnect. Commands can be issued independent of data. The address (Addr) signal is typically an indication of a particular resource that an initiator functional block wishes to access. Request Accept (ReqAccept) is a handshake signal whereby slave 1104 allows master 1102 to release Cmd, Addr and DataOut from one transfer and reuse them for another transfer. If slave 1104 is busy and cannot participate in a requested transfer, master 1102 must continue to present Cmd, Addr and DataOut. DataOut is data sent from a master to a slave, typically in a write transfer. DataIn typically carries read data.

Response (Resp) and DataIn are signals sent from slave 1104 to master 1102. Resp indicates that a transfer request that was received by slave 1104 has been serviced. Response accept (RespAccept) is a handshake signal used to indicate whether the master allows the slave to release Resp and DataIn.

Signals Clock, Cmd, Addr, DataOut, ReqAccept, Resp, DataIn, and RespAccept, in one embodiment, make up a basic set of interface module signals. For some functional blocks, the basic set may be adequate for communication purposes.

In other embodiments, some or all of the remaining signals of bus 1012 may be used. In one embodiment, Width is a three-bit signal that indicates a width of a transfer and is useful in a connection that includes transfers of variable width. Burst is a multibit signal that allow individual commands to be associated within a connection. Burst provides an indication of the nature of future transfers, such as how many there will be and any address patterns to be expected. Burst has a standard end marker. Some bits of the Burst field are reserved for user-defined fields, so that a connection may be ignorant of some specific protocol details within a connection.

Interrupt and error signals are an important part of most computer systems. Interrupt and error signals generated by initiator or target functional blocks are shown, but the description of their functionality is dependent upon the nature of a particular functional block and is not important to understanding the invention.

Request Thread Identifier (ReqThreadID), in one embodiment, is a four-bit signal that provides the thread number associated with a current transaction intended for slave 1104. All commands executed with a particular thread ID must execute in order with respect to one another, but they may execute out of order with respect to commands from other threads. Response Thread Identifier (RespThreadID) provides a thread number associated with a current response. Because responses in a thread may return out of order with respect to other threads, RespThreadID is necessary to identify which thread's command is being responded to. In one embodiment, ReqThreadID and RespThreadID are optional signals, but if one is used, both must be used.

Request Thread Busy (ReqThreadBusy) allows the slave to indicate to the master that it cannot take any new requests associated with certain threads. In one embodiment, the ReqThreadBusy signal is a vector having one signal per thread, and a signal asserted indicates that the associated thread is busy.

Response Thread Busy (RespThreadBusy) allows the master to indicate to the slave that it cannot take any responses (e.g., on reads) associated with certain threads. The RespThreadBusy signal is a vector having one signal per thread, and a signal asserted indicates that the associated thread is busy.

Request Connection Identifier (ReqConnID) provides the CONNID associated with the current transaction intended for the slave. CONNIDs provide a mechanism by which a system entity may associate particular transactions with the system entity. One use of the CONNID is in establishing request priority among various initiators. Another use is in associating actions or data transfers with initiator identity rather than the address presented with the transaction request.

The embodiment of FIG. 11 provides end-to-end connection identification with CONNID as well as point-to-point, or more local identification with Thread ID. A Thread ID is an identifier of local scope that simply identifies transfers between the interface module and its connected functional block. In contrast, the CONNID is an identifier of global scope that identifies transfers between two interface modules (and, if required, their connected functional blocks).

A Thread ID should be small enough to directly index tables within the connected interface module and functional block. In contrast, there are usually more CONNIDs in a system than any one interface module is prepared to simultaneously accept. Using a CONNID in place of a Thread ID requires expensive matching logic in the interface module to associate a returned CONNID with specific requests or buffer entries.

Using a networking analogy, the Thread ID is a level-2 (data link layer) concept, whereas the CONNID is more like a level-3 (transport/session layer) concept. Some functional blocks only operate at level-2, so it is undesirable to burden the functional block or its interface module with the expense of dealing with level-3 resources. Alternatively, some functional blocks need the features of level-3 connections, so in this case it is practical to pass the CONNID through to the functional block.

Referring to FIG. 4, a CONNID is required to be unique when transferred between interface modules 1004 and 1006 on shared communications bus 1012. The CONNID may be sent over a local interconnect, such as interconnect 1010. In many cases, however, it is much more efficient to use only Thread ID between a functional block and its interface module. For example initiator functional block 1002 may not require all the information provided by the CONNID. Also, in some systems, multiple identical initiator functional blocks 1002 may exist with the same CONNID so that a particular target functional block 1008 receiving a transfer will not know which connection it is actually part of unless logic in initiator interface module 1004 translates the "local" CONNID to a unique "global" CONNID. The design and implementation of such a translation functionality in an interface module is complicated and expensive. In such cases, the CONNID may be sent between interface modules over shared communications bus 1012 while the Thread ID is sent between a functional block and an interface module.

In the case of an initiator functional block, a one-to-one static correspondence may exist between Thread ID and CONNID. For example if the Thread ID is "1", a single CONNID is mapped for a particular interface module, solving the problem of multiple, identical functional blocks.

In the case of a target functional block, there is a one-to-one dynamic correspondence between a Thread ID and a CONNID. If a target functional block supports two simultaneous threads, the target interface module acquires the CONNID of an open connection and associates it with a thread as needed. For example, a target interface module receives a CONNID of "7", and then maps CONNID 7 to thread "0". Thereafter, all transfers with CONNID 7 are associated with thread 0 until connection 7 is closed.

Referring to FIG. 12, an example of a use of Thread ID, consider a series of identical direct memory access (DMA) engines in a system. In FIG. 12, elements 1202 are identical DMA engines, each connected to an initiator interface module 1204. Initiator interface modules 1204 are connected to shared communications bus 1212. Target interface module 1206 is also connected to shared communications bus 1212 and transmits data from bus 1212 to DRAM controller 1208, which is a target functional block. Target interface module 1206 is connected to DRAM controller 1208 by interconnect 1214. DRAM controller 1208 controls access to DRAM 1213.

A DMA a engine is an example of an initiator functional block that also functions as a target functional block. When the DMA engine is programmed by software, it acts as a target. Thereafter, the DMA engine is an initiator. Because a DMA engine performs both read and write operations, two connections can be associated with a single DMA engine. If some buffering is available in the DMA engine, read and write operations may be decoupled so that both types of operations can be performed concurrently. A read may occur from a long latency storage device which requires the read data to be buffered on the DMA engine before a write operation writes the data. In one embodiment, each of DMA engines 1202 uses a Thread ID to identify the read stream and a different Thread ID to identify the write stream. The DMA engine does not require more information, such as what other functional block participates in a transaction. Therefore, a CONNID is not required to be sent from the DMA engine 1202 to a connected interface module 1204. Mapping of a Thread ID to a CONNID occurs in the interface module 1204.

In one embodiment, each initiator interface module 1204 maps a unique CONNID to each of two Thread IDs from a connected DMA engine 1202. Each of DMA engines 1202 use a single bit, for example, Thread ID of FIG. 11, to distinguish between its two threads. For each transfer over shared communications bus a unique CONNID is sent to target interface module 1206. The CONNID may include priority information, for example, assigning high priority to requests for graphics data. The high priority graphics data request 1207 is immediately serviced by DRAM controller 1208 while lower priority request 1205 may be required to wait.

Because intelligence is designed into the interface modules and the communications protocols, less intelligence is required of the functional block such as the DRAM controller 1208 and the DMA engines 1202. This has the advantage of making functional blocks more portable or reusable as systems evolve. For example, a DMA engine used for a high priority application may be switched with a DMA engine used for a lower priority application simply by changing their respective connected interface modules.

In one embodiment, target and initiator interface modules are programmed at the transistor level so that their precise function, including their CONNID assignment, is fixed at power-up. In another embodiment, the design of interface modules is in RAM so that the interface module is a reprogrammable resource. In this case, the interface module is reprogrammed, including reassignment of CONNIDs, by software.

The above discussed communication system may include at least two functional blocks. A first functional block communicates with a second functional block by establishing a connection. A connection is a logical state in which data may pass between the first functional block and the second functional block. A bus may couple to each of the functional blocks and configured to carry a plurality of signals. The plurality of signals comprises a connection identifier that indicates a particular connection that a data transfer is part of. The plurality of signals may further comprise a thread identifier that indicates a transaction stream that the data transfer is part of.

The communication system may further include an initiator functional block, an initiator interface module, a target functional block, and a target interface module. The initiator functional block sends transfer requests. The initiator interface module couples to the initiator functional block and to the bus. The target functional block responds to transfer requests. The target interface module couples to the target functional block. The connection identifier is sent with a transfer request from the initiator interface module to the target interface module.

A thread identifier can be sent from the target interface module to the target functional block and from the initiator interface module to the initiator functional block. A connection identifier can be sent from the target interface module to the target functional block and from the initiator interface module to the initiator functional block. The connection identifier may be a multi-bit value that encodes information including: a transfer priority; a transfer order; and an functional block that originated the transfer. The connection identifier is one of a plurality of connection identifiers associated with an initiator functional block. The connection identifier can be mapped to a thread identifier by the initiator interface module. The connection identifier can also be one of a plurality of connection identifiers associated with a target functional block that supports simultaneous connections. The target functional block acquires a connection identifier of an open connection and maps the connection identifier to a thread identifier.

The plurality of signals may include the following. A request thread ID signal that indicates a thread number associated with a current transaction intended for a target functional block. A response thread ID signal that indicates a thread that a transfer from the target functional block is part of. A request thread busy signal that indicates that indicates to an initiator functional block that the target functional block cannot receive new requests associated with certain threads. A response thread busy signal that indicates that the initiator functional block cannot receive any new responses from the target functional block that are associated with certain threads.

A method for communicating between functional blocks in a computer system may include the following steps. A plurality of connection identifiers can be established. Each connection identifier associates a particular data transfer with a particular connection. A connection is a logical state in which data may pass between an initiator functional block of the plurality of functional blocks and a target functional block of the plurality of functional blocks. A connection is established when a particular data transfer is initiated. An initiator functional block is allowed to issue a first transfer "Y" if the transfer "Y" is an oldest, non-issued, non-retired transfer among a set of transfer requests with a same connection identifier as the transfer "Y". The initiator functional block is allowed to issue the transfer "Y" if every non-retired transfer with the same connection identifier is older than the transfer "Y" and is currently issued to a same target functional block as the transfer "Y". If the transfer "Y" is issued, then the transfer "Y" is considered pipelined with the older, non-retired transfers.

The target functional block may give a BUSY response to every later transfer that is pipelined with the transfer "X" and has a same connection identifier as the transfer "X" if the target functional block responds to the transfer "X" so that an initiator initiating the transfer "X" may not retire the transfer "X". A transfer "Y" that is issued after a transfer "X", is older than the transfer "X", and has a same connection identifier as the transfer "X" is considered not pipelined with the transaction "X". A target functional block determines whether a transfer is a pipelined transfer based upon when the transfer occurs and upon a connection identifier associated with the transfer.

An initiator functional block maintains a time-ordered queue of desired transfers with a same connection identifier. The initiating functional block marks a transfer as non-issued and non-retired as it is entered into the queue. If a next oldest entry is non-retired and addresses a same target functional block, then mark the transfer as pipelined; else, mark the transfer as non-pipelined. When a transfer issues, mark the transfer as issued. When a transfer is completed, mark the transfer as non-issued. If the transfer is successfully completed, mark the transfer as retired; and deleting the transfer from the queue. If the transfer is not successfully completed, re-attempt the transfer.

The target functional block maintains a time-ordered queue having a depth that is a number of bus clock cycles between a request for a transfer and a response to the request. On each cycle of the bus clock, retire an oldest entry in the time-ordered queue. On each cycle of the bus clock, add a new entry to the time-ordered queue, including a connection identifier associated with a current request for a transfer. If a current request for a transfer contains a valid transfer that selects the target functional block, allow a FIRST bit and a BUSY bit of an entry in the time-ordered queue to be set. A set FIRST bit implies that an associated transfer is a first transfer of a set of potentially pipelined transfers; else, clearing the FIRST bit and the BUSY bit. Setting the FIRST bit if: no transfer in the time-ordered queue is earlier than a current transfer, has a same connection identifier as the current transfer and has an associated FIRST bit set; and the current transfer will receive a BUSY response due to a resource conflict. Setting the BUSY bit if: the target functional block has a resource conflict; or an earlier transfer in the time-ordered queue has an associated FIRST bit set and has a same connection identifier as a current transfer. A connection identifier may be used to enforce ordering among transfers. In response to a first request for a data transfer issued in a first bus cycle, the target functional block sets a BUSY bit in a first time-ordered queue entry. A first connection identifier is associated with the first request. In response to a second request for a data transfer in a next bus cycle subsequent to the first bus cycle, the target functional block clears a BUSY bit in a second time-ordered queue entry and performs an action in connection with executing the data transfer requested in the second request.

The present invention has been described in terms of specific embodiments. For example, embodiments of the present invention have been shown as systems of particular configurations, including communications buses using particular protocols. One of ordinary skill in the art will recognize that modifications may be made without departing from the spirit and scope of the invention as set forth in the claims. For example, the present may be used in systems employing shared communications structures other than buses, such as rings, cross-bars, or meshes.

What is claimed is:

1. An apparatus, comprising:
   a communication medium coupled to a plurality of functional blocks, including initiator functional blocks and target functional blocks, in an integrated circuit, wherein three or more of the initiator functional blocks communicate with a target functional block by sending requests that each have an associated identifier to indicate a transaction stream that the request is part of; and
   a plurality of buffers are associated with the target functional block at an interface of the target functional block to the communication medium, wherein the plurality of buffers receive requests with their associated identifier from the three or more initiator functional blocks through a shared common connection point for the interface, wherein the communication medium implements a mapping algorithm to map a request of a first transaction stream sent by a first initiator functional block to a first buffer based on the identifier associated with the first transaction stream, the mapping algorithm to also map a request of a second transaction stream sent by a second initiator functional block to a second buffer based on the identifier associated with the second transaction stream, and the mapping algorithm to also map a request of a third transaction stream sent by a third initiator functional block to the first buffer based on the identifier associated with the third transaction stream, wherein the first buffer is dedicated to service requests from two or more of the initiator functional blocks including the first and third initiator functional blocks.

2. The apparatus as set forth in claim 1, wherein the associated identifier includes a multi-bit value that encodes information including a transfer priority level and an identity of a functional block that originated the transfer.

3. The apparatus as set forth in claim 1, wherein the associated identifier also includes an order of that requests were issued in the transaction stream and a plurality of identifiers are associated with the second initiator functional block.

4. The apparatus as set forth in claim 1, wherein the first buffer is dedicated to store requests associated with a first priority level and the second buffer is dedicated to store requests associated with a second priority level.

5. The apparatus as set forth in claim 1, wherein associated identifiers ending in an even number are mapped to the first buffer, which is dedicated to requests associated with a first priority level, and associated identifiers ending in an odd number are mapped to the second buffer, which is dedicated to requests associated with a second priority level that is different than the first priority level, and the target functional block contains logic that services requests in the second buffer before servicing requests in the first buffer.

6. The apparatus as set forth in claim 1, wherein the target functional block contains logic configured to allow the target functional block to choose which requests the target functional block will reject based upon both the associated identifier and an internal state of the target functional block.

7. The apparatus as set forth in claim 1, wherein the associated identifier is a connection ID.

8. The apparatus as set forth in claim 1, wherein the associated identifier is a thread ID.

9. The apparatus as set forth in claim 1, wherein the requests include write requests and read requests and the communication medium is an interconnect bus.

10. The apparatus as set forth in claim 1, further comprising:
    a data storage component in the first initiator functional block to store one or more identifiers associated with the first initiator block, wherein the one or more identifiers associated with the first initiator block are re-configurable during an operation of the apparatus by changing data indicative of the associated identifiers stored in the data storage component at either system build time or system run time.

11. The apparatus as set forth in claim 1, wherein the integrated circuit is a System-on-a-Chip, the communication medium is an interconnect bus, and the plurality of buffers are two or more queues in shared memory component.

12. The apparatus as set forth in claim 1, wherein the shared common connection point is a target interface module.

13. The apparatus as set forth in claim 1, wherein the shared common connection point is a dynamic random access memory controller.

14. The apparatus as set forth in claim 1, wherein a stream identifier located in the initiator functional block provides the associated identifier for each transaction stream.

15. The apparatus as set forth in claim 1, wherein a stream identifier located in the interface provides the associated identifier for each transaction stream.

16. An integrated circuit, comprising:

a communication medium coupled to a plurality of the functional blocks, wherein three or more of the initiator functional blocks communicate with a target functional block by sending requests that each have an associated identifier to indicate a transaction stream that the request is part of; and at least a first and a second of buffer associated with the target functional block at an interface of the target functional block to the communication medium, wherein the buffers are configured to receive the requests having their associated identifier from the three or more initiator functional blocks through a shared common connection point for the interface, wherein the communication medium to implement a mapping algorithm to map requests from a first initiator functional block as well as requests from a third initiator functional block to a first dedicated buffer based on the associated identifiers, and to map requests from a second initiator functional block to a second buffer based on the associated identifier.

17. The integrated circuit as set forth in claim 16, wherein the integrated circuit is a System-on-a-Chip, the communication medium is an interconnect, and the buffers are two or more queues in shared memory component.

18. The integrated circuit as set forth in claim 16, wherein the shared common connection point is a dynamic random access memory controller and the first dedicated buffer to store requests has a different priority level than and the requests stored in the second buffer.

* * * * *